US010530289B2

(12) United States Patent
Andrieux et al.

(10) Patent No.: US 10,530,289 B2
(45) Date of Patent: Jan. 7, 2020

(54) MECHATRONIC ASSEMBLY CONTROLLED BY A TORQUE AND DIRECTION SIGNAL SEPARATE FROM THE POWER SIGNAL

(71) Applicant: MMT SA, Zug (CH)

(72) Inventors: Gaël Andrieux, Evilard (CH); Eric Rondot, Berthelange (FR)

(73) Assignee: MMT SA, Zug (CH)

( * ) Notice: Subject to any disclaimer, the term of this patent is extended or adjusted under 35 U.S.C. 154(b) by 7 days.

(21) Appl. No.: 15/528,175

(22) PCT Filed: Nov. 20, 2015

(86) PCT No.: PCT/EP2015/077259
§ 371 (c)(1),
(2) Date: May 19, 2017

(87) PCT Pub. No.: WO2016/079315
PCT Pub. Date: May 26, 2016

(65) Prior Publication Data
US 2017/0331409 A1 Nov. 16, 2017

(30) Foreign Application Priority Data
Nov. 20, 2014 (FR) ..................... 14 61241

(51) Int. Cl.
*G05B 19/40* (2006.01)
*H02P 27/08* (2006.01)
(Continued)

(52) U.S. Cl.
CPC ............ *H02P 27/085* (2013.01); *H02P 27/12* (2013.01); *H02P 27/14* (2013.01); *B60L 15/025* (2013.01)

(58) Field of Classification Search
CPC ...... B60L 15/025; H02P 27/08; H02P 27/085; H02P 27/12; H02P 27/14
(Continued)

(56) References Cited

U.S. PATENT DOCUMENTS 4,365,187 A 12/1982 McDaniel et al.
5,519,294 A 5/1996 Chen et al.
(Continued)

FOREIGN PATENT DOCUMENTS

EP 0483894 A1 5/1992
EP 2528227 A1 11/2012
WO WO-2014/091152 A2 6/2014

*Primary Examiner* — Muhammad S Islam
(74) *Attorney, Agent, or Firm* — Harness, Dickey & Pierce, PLC (57) ABSTRACT

A mechatronic assembly drives a member intended to be linked to a DC electrical power source and to an ECU control unit. The ECU includes a computer for executing a feedback control algorithm delivering an item of direction and torque information. The assembly includes an actuator formed by a brushless polyphase electric motor having N phases, binary detection probes for detecting the position of the rotor of the motor, an electronic circuit comprising a power bridge for powering the N phases of the motor. It further includes an onboard electronic control circuit without a microcontroller, computer and memory of which the input receives the item of direction and torque information from the ECU and of which the output controls the power bridge directly modulating the current of the DC electrical power source applied to each of the phases of the motor, and the torque and direction information provided by the ECU is separate from the power signal delivered only by the power source.

23 Claims, 13 Drawing Sheets (51) Int. Cl.
*H02P 27/12* (2006.01)
*H02P 27/14* (2006.01)
*B60L 15/02* (2006.01)

(58) Field of Classification Search
USPC ......... 318/400.29, 136, 400.07, 400.15, 432, 318/434, 667
See application file for complete search history.

(56) References Cited

U.S. PATENT DOCUMENTS

| | | | |
|---|---|---|---|
| 5,773,941 A | 6/1998 | Moritz et al. | |
| 5,903,117 A * | 5/1999 | Gregory | H02P 6/30 318/400.09 |
| 6,360,719 B1 * | 3/2002 | Uitenbroek | F02B 29/083 123/190.1 |
| 6,424,798 B1 * | 7/2002 | Kitamine | H02P 6/18 388/800 |
| 6,828,702 B2 | 12/2004 | Beyer et al. | |
| 6,894,402 B2 | 5/2005 | Dubus et al. | |
| 7,028,545 B2 | 4/2006 | Gandel et al. | |
| 7,121,240 B2 | 10/2006 | Tani | |
| 7,304,450 B2 | 12/2007 | Prudham | |
| 7,589,445 B2 | 9/2009 | Gandel et al. | |
| 7,591,448 B2 | 9/2009 | Martin et al. | |
| 2004/0036295 A1 * | 2/2004 | Nakagawa | F02N 11/04 290/31 |
| 2004/0085041 A1 * | 5/2004 | Prudham | F02D 11/10 318/721 |
| 2006/0123903 A1 | 6/2006 | Gandel et al. | |
| 2008/0067960 A1 * | 3/2008 | Maeda | B62D 5/046 318/400.02 |
| 2008/0105230 A1 | 5/2008 | Kishibata et al. | |
| 2012/0068642 A1 | 3/2012 | Chen et al. | |
| 2012/0169263 A1 | 7/2012 | Gallegos-Lopez et al. | |
| 2013/0069580 A1 | 3/2013 | Ogawa | |
| 2015/0123651 A1 | 5/2015 | Biwersi et al. | |
| 2015/0323908 A1 | 11/2015 | Rondot et al. | |
| 2016/0072413 A1 * | 3/2016 | Grasblum | H02P 1/163 318/254.1 |

\* cited by examiner

| Ha | Hb | Hc | S1 | S2 | S3 | S4 | S5 | S6 |
|----|----|----|----|----|----|----|----|----|
| 1  | 1  | 0  | 0  | 0  | 1  | 0  | 1  | 1  |
| 0  | 1  | 0  | 1  | 1  | 1  | 0  | 0  | 0  |
| 0  | 1  | 1  | 1  | 1  | 0  | 0  | 1  | 0  |
| 0  | 0  | 1  | 0  | 0  | 1  | 1  | 1  | 0  |
| 1  | 0  | 1  | 1  | 0  | 1  | 1  | 0  | 0  |
| 1  | 0  | 0  | 1  | 0  | 0  | 0  | 1  | 1  |

Figure 13

| Ha | Hb | Hc | T1H | T1L | T2H | T2L | T3H | T3L | PhA (Ton) | PhB (Ton) | PhC (Ton) |
|---|---|---|---|---|---|---|---|---|---|---|---|
| 1 | 1 | 0 | 0 | 0 | PWM | PWM/ | PWM/ | PWM | Z | PWM | PWM/ |
| 0 | 1 | 0 | PWM/ | PWM | PWM | PWM/ | 0 | 0 | PWM/ | PWM | Z |
| 0 | 1 | 1 | PWM/ | PWM | 0 | 0 | PWM/ | PWM | PWM/ | Z | PWM |
| 0 | 0 | 1 | 0 | 0 | PWM/ | PWM | PWM/ | PWM | Z | PWM/ | PWM |
| 1 | 0 | 1 | PWM | PWM/ | PWM/ | PWM | 0 | 0 | PWM | PWM/ | Z |
| 1 | 0 | 0 | PWM | PWM/ | 0 | 0 | PWM/ | PWM | PWM | Z | PWM/ |

MECHATRONIC ASSEMBLY CONTROLLED BY A TORQUE AND DIRECTION SIGNAL SEPARATE FROM THE POWER SIGNAL

CROSS-REFERENCE TO RELATED APPLICATIONS

This application is a National Phase Entry of International Patent Application Serial Number PCT/FR2015/077259, filed on Nov. 20, 2015, which claims priority to French Patent Application Serial No. 14/61241, filed on Nov. 20, 2014, both of which are incorporated by reference herein.

TECHNICAL FIELD

This invention relates to the area of mechatronic assemblies controlled in pulse width modulation, for example for automotive applications such as, for example, the phase shift of the camshaft.

BACKGROUND

It is known, in the prior art, different solutions, and particularly that described in the patent application WO2014/091152 describing a mechatronic unit for positioning a member comprising a control unit and an actuator. The control unit (ECU) includes a servo algorithm and a power bridge. It drives the power bridge, delivering a two-wire electrical signal composed of a torque signal and a steering signal. The actuator comprises an N-phase multi-phased brushless electric motor, binary probes for detecting the position of the rotor of this motor, power switches suitable for supplying the N phases of the motor from the two-wire electrical signal. The state of the power switches is controlled directly by a signal coming from the sensing probes.

In this document, the two-wire signal including the torque information, the steering information and also drives the power (voltage/current) used by the motor phases.

The solution proposed in the prior art is particularly effective for low power electric motors.

However, for stronger power motors, the direct supply of the power bridge by the signals from an ECU implies power losses by Joule effect. Also, the ECUs are not generally known for strong power management which may lead to a lack of reliability and a significant material cost.

It is also known that patent application US2012/068642 describes a single-phase control device for a brushless DC motor, pulse width modulation (PWM) and a switching logic unit for controlling the speed and rotation of a single-phase motor.

The structure of a single-phase motor provides for a number of poles identical to the stator and the rotor, and a control mode specific to such an iso-polar architecture. The teaching of such a control device cannot be transposed to a multi-phased motor. Indeed, a multi-phased motor comprises a stator consisting of excitation coils which are generally 3 or 6 (this is an indicative example). These are most often star-connected, but they can also be connected in delta. The rotor consists of permanent magnets with 2 to 8 poles with an alternation of the North and South poles.

Most BLDC motors also include a set of three Hall effect sensors that, positioned at 60° or 120° from each other, know the position of the rotor. Knowing the rotor's position allows an auxiliary electronic circuit to switch the power supply. A multi-phased motor is controlled by a switching sequence which is fundamentally different from the control of a single-phase motor and it is therefore not obvious to a person skilled in the art to combine teachings relating to a motor and a single-phase control, for designing a motor and a multi-phased driver circuit.

The purpose of this invention will be restricted to multi-phased motors where N is greater than 1. For motors where N=1 (mono-phased motor), the skilled professional admits that the start-up sequence and the means to impose rotation steering is not trivial and generally and generally uses an electronic circuit to steer the complex and intelligent motor (eg a microcontroller).

SUMMARY

The purpose of developing this invention is to:
retain the simplicity of driving the circuit described in the WO2014/091152 application,
drive a high-power BLDC motor,
be compatible with a low or medium power ECU even without power output,
simplify and reduce the costs of the ECU,
offer a driving solution for a brushless DC motor (BLDC) free of complex electronics and/or requiring the use of a microcontroller,
minimize the number of connection points between the mechatronic system and the ECU.

The scope of the invention relates to strong power brushless (BLDC) motors, and as such, the solutions of tri-phased motors with bipolar control are presented. Although feasible and also covered by this invention, single-polar controls with one or two coils, defined in the WO2014/091152 application, is less favourable.

More specifically, the invention is referred to a mechatronic unit for driving a member intended to be connected on the one hand to a DC power source and on the other hand to an ECU control unit comprising a computer for performing a servo algorithm delivering steering and torque information, such unit comprising an actuator formed by a N-phase multi-phased brushless electric motor, binary sensors for detecting the position of this motor rotor, an electronic circuit comprising a power bridge for supplying the N phases of the motor, characterized in that it further comprises an on-board electronic driver circuit whose input receives this steering and torque information from the ECU and whose output controls this power bridge directly modulating the current of the DC power source applied to each of these motor phases and in that the torque and steering information provided by the ECU is distinct from the output power signal delivered only by the power source.

The torque information is information which makes it possible to adjust, at the output of the power bridge, the position or speed of the rotor of the loaded motor.

The preferred field of application here is automotive, where the mechatronic unit is for example intended for a camshaft shifter. The mechatronic unit motor according to the invention makes it possible to adjust the camshaft rotation phase relative to the rotation of the drive shaft. In this example, the mechatronic unit may therefore be placed near to the member to be steered, connected to the automobile's battery—the power source—the ECU sending only the steering and requested torque level information without this ECU delivering power signals. Other applications where the mechatronic unit is intended to move a flue gas recirculation valve (EGR), or else allows the adjustment of a variable geometry turbo.

Specifically, the mechatronic unit includes methods to extract a first steering signal and a second torque signal from this steering and torque information delivered by the ECU.

In a preferred mode, the steering and torque information delivered by the ECU is in the form of a "pulse width modulation (PWM) signal" in the remainder of the text.)

In a particular embodiment, such extraction method of this first steering signal and this second torque signal provides a first steering state when the pulse width over a period is less than a threshold value (50%), and a second steering state when the pulse width over a period is greater than or equal to this threshold value.

In this instance, this extraction method of this first steering signal and this second torque signal delivers a torque signal as a function of the deviation in absolute value between a reference value and the cyclic ratio of this information delivered by the ECU.

Preferably, this threshold value is equal to this reference value and equal to 0.5.

In another embodiment, the mechatronic unit includes means for extracting a first steering signal and a second torque signal from this steering and torque information delivered by the ECU as a first steering information and a second torque information, where this information is applied to a set of logic gates constituting this extraction method.

In another embodiment, the mechatronic unit includes means for extracting a first steering signal and a second torque signal from this steering and torque information delivered by the ECU as a first steering information from a power H bridge where this information is applied to a set of logic gates constituting this extraction method.

From an error management perspective, the mechatronics unit includes bidirectional information means signalling a defect of this mechatronic unit to the ECU in the form of information forcing the pulse width modulation signal to zero.

In this instance, it may be envisaged that the bidirectional information means make it possible to acknowledge this fault after being taken into account by the ECU by sending back information in normal operation to the mechatronic unit.

BRIEF DESCRIPTION OF THE DRAWINGS

Other characteristics and advantages of the invention will emerge from the reading which follows examples of detailed embodiments, with reference to the accompanying drawings, in which:

FIG. 9b, the result of the processing carried out by the logic gates used in FIG. 9a;

DETAILED DESCRIPTION

Figure 1:
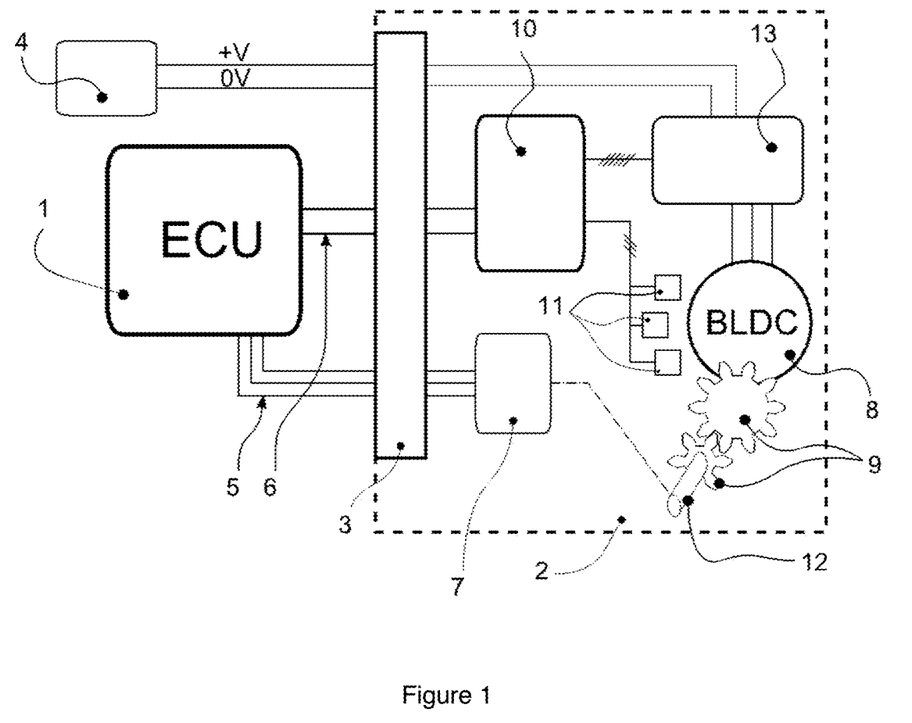
FIG. 1 shows the general block diagram of the control unit of a mechatronic unit according to the invention.

FIG. 1 describes schematically a mechatronic unit based on the invention as well as the elements needed for its control and supply. An electronic control unit-ECU-(1), for example an automotive controller, the mechatronic unit (2) according to the invention, at least one connector (3), a continuous source of electrical power (4). For example an automobile battery, Hall probes (11), generally three in number when associated with a tri-phased motor, detecting the rotation of the brushless motor (8) and intended to allow the self-switching of the phases of the motors, an angular position sensor (7) informing on the absolute position of an output shaft (12) controlled by the motor (8) through a mechanical movement reduction system (9). The position sensor (7) sends position information (5) to the ECU (1). This ECU (1) delivers torque and position information (6) to an on-board electronic driver circuit (10). The power signal coming from the power source (4) is directly applied to the power bridge (13) containing generally 6 transistors to supply the 3 phases of the BLDC motor (8).

Figure 2:
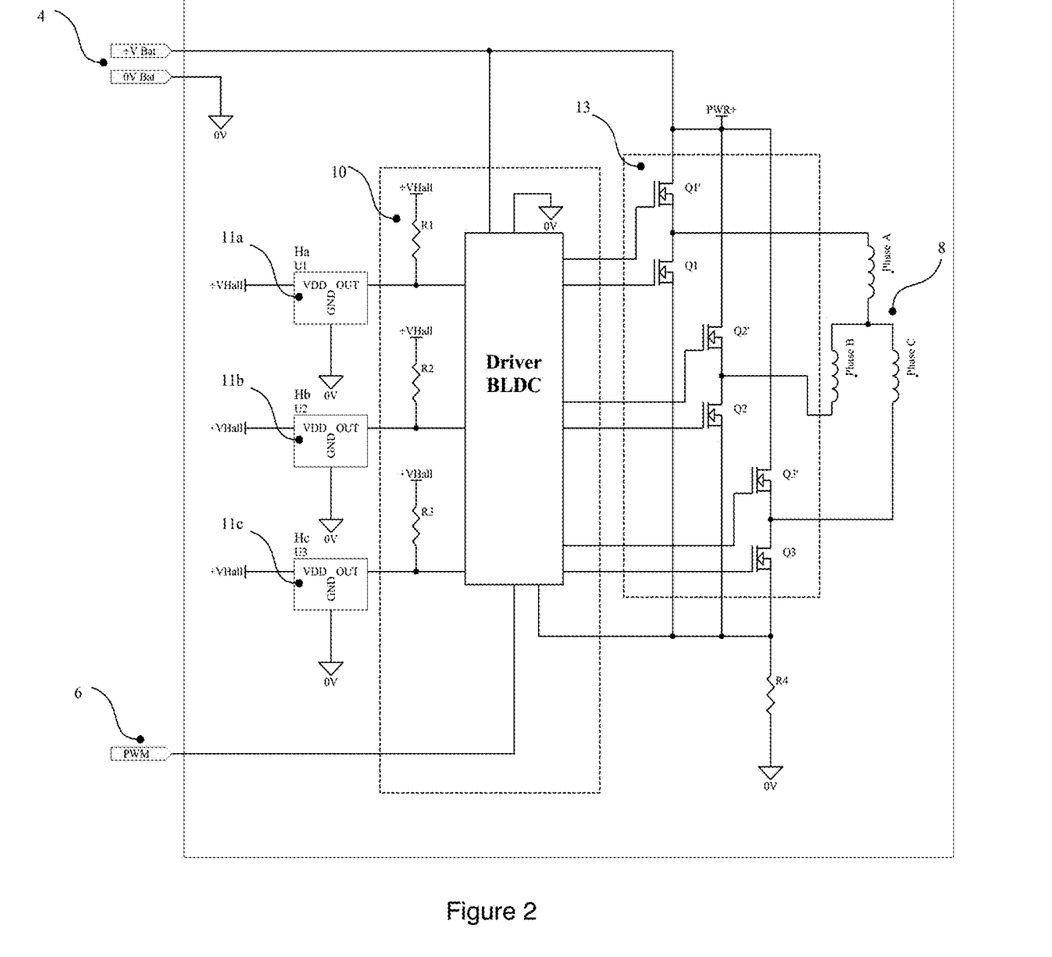
FIG. 2 shows a first embodiment of the invention in which the torque and steering control signals are in the form of a single MLI signal (also referred to as PWM)

FIG. 2 describes a preferred first embodiment where the steering and torque signal is given only by a PWM single signal which enters the driver circuit directly. The signal coming from the power source enters the power bridge directly to supply the motor phases based on the control order from the driver circuit. In this illustration, the signal coming from the power source also enters the driver circuit but is only intended to supply, as needed, the circuit through a voltage regulator, typically a 5 Volts regulator, where this regulator may thus be able to supply also the Hall probes (11*a*, 11*b*, 11*c*) used to detect the position of the motor rotor. The signals coming from these Hall probes enter in the driver circuit.

Figure 5:
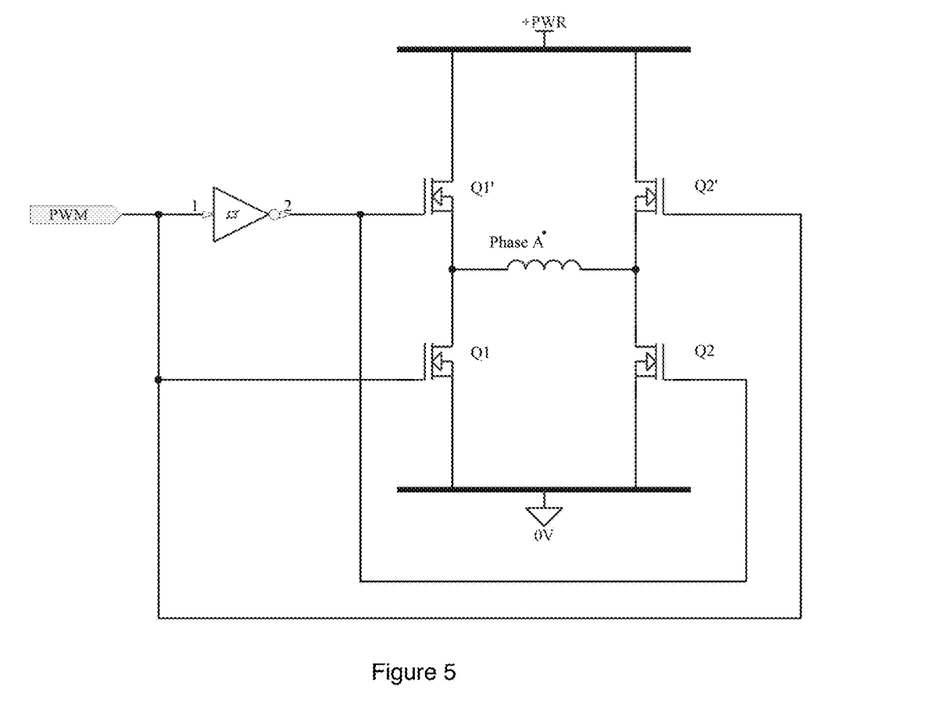
FIG. 5 shows the use of the so-called "synchronous rectification" mode.

FIG. 5 presents the option for configuring the operation of the driver circuit with a recirculation of the currents in the so-called fast decay mode and also the synchronous rectification mode. This synchronous rectification mode permits the complementary driving of the two transistors of the same branch, enabling circulation/recirculation of the current from/to the power source (battery).

Figure 12:
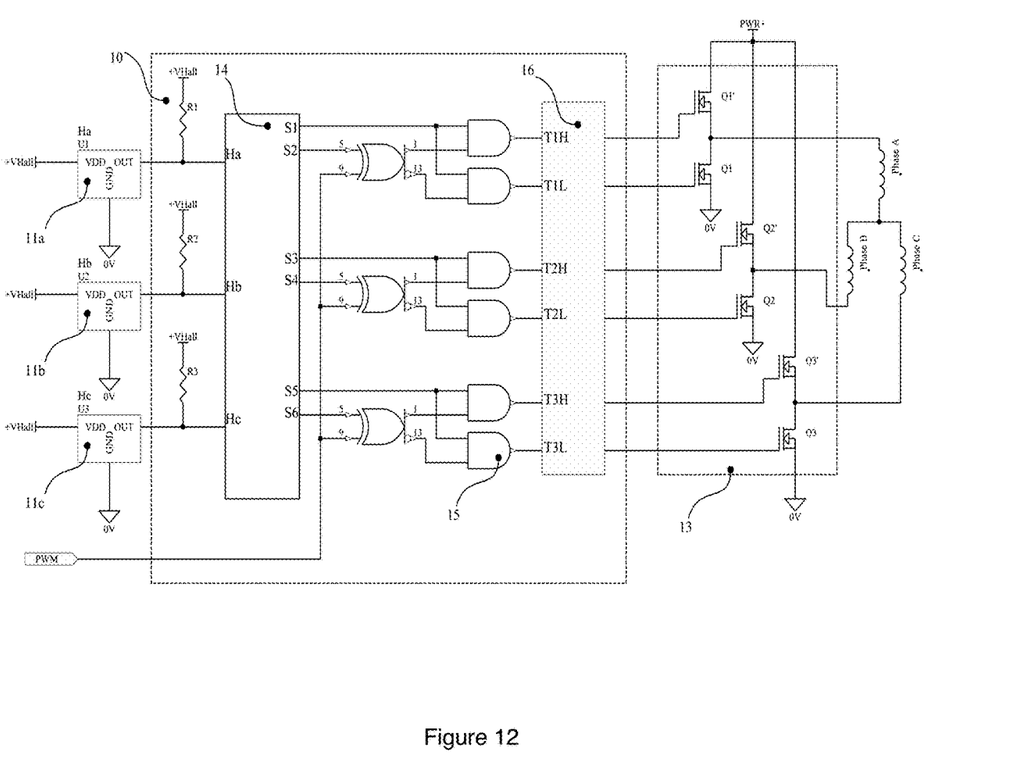
FIG. 12 is a schematic diagram of a self-switching device of a brushless motor with a fast decay and synchronous rectification mode.
Figure 13:
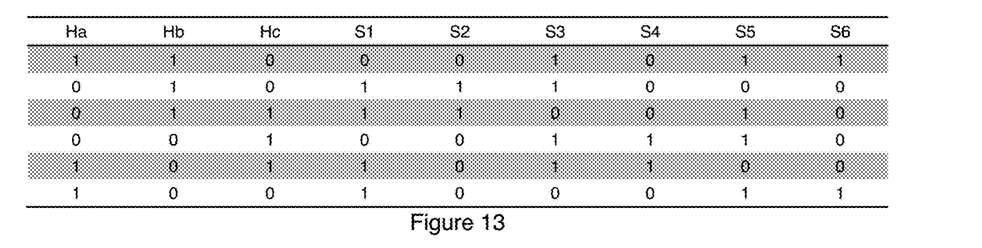
FIG. 13 shows the truth table of the self-commutation logic in fast decay mode.
Figure 14:
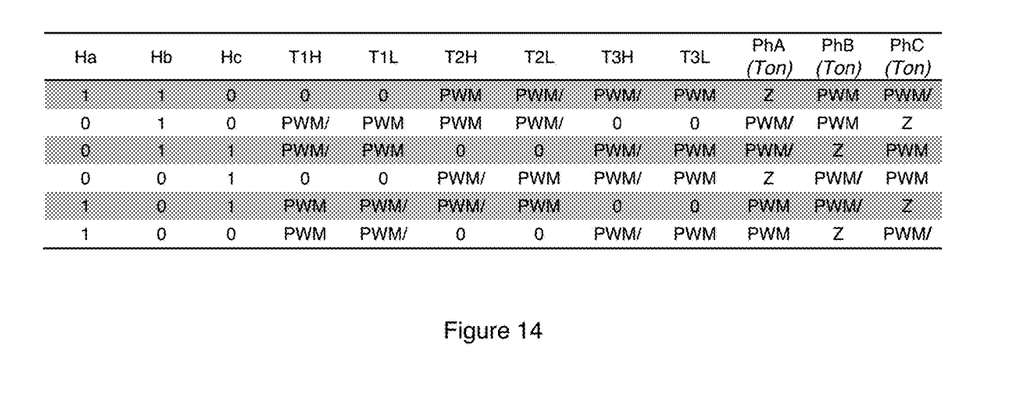
FIG. 14 shows the truth table of the control of the transistors of the tri-phased bridge.

FIG. 12 summarizes in detail the principle set out in FIG. 2 and FIG. 5 introducing a specific mode for the chopping mode applied to the transistors of the tri-phased bridge. This chopping mode called fast decay+synchronous rectification allows a bidirectional rotation control of the motor governed by a unique control PWM signal. The three Hall probes integrated into the motor (11*a*, 11*b*, 11*c*) inform the rotor position to a switch logic (14) defining the control state of the power bridge (13) pursuant to the truth table detailed in FIG. 13. The logical combination of these last signals with the control PWM signal drives the transistor control pursuant to the truth table described in FIG. 14.

Figure 15:
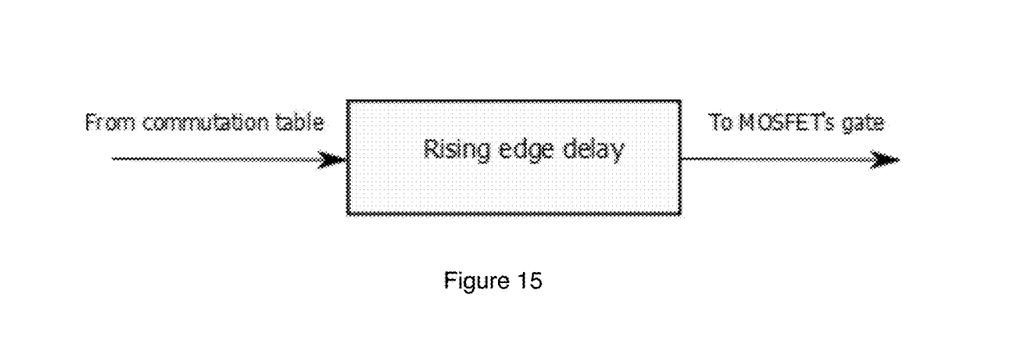
FIG. 15 shows the detail of a part of the diagram of FIG. 12 describing the system for protecting the simultaneous anti-conduction ("cross conduction")
Figure 16:
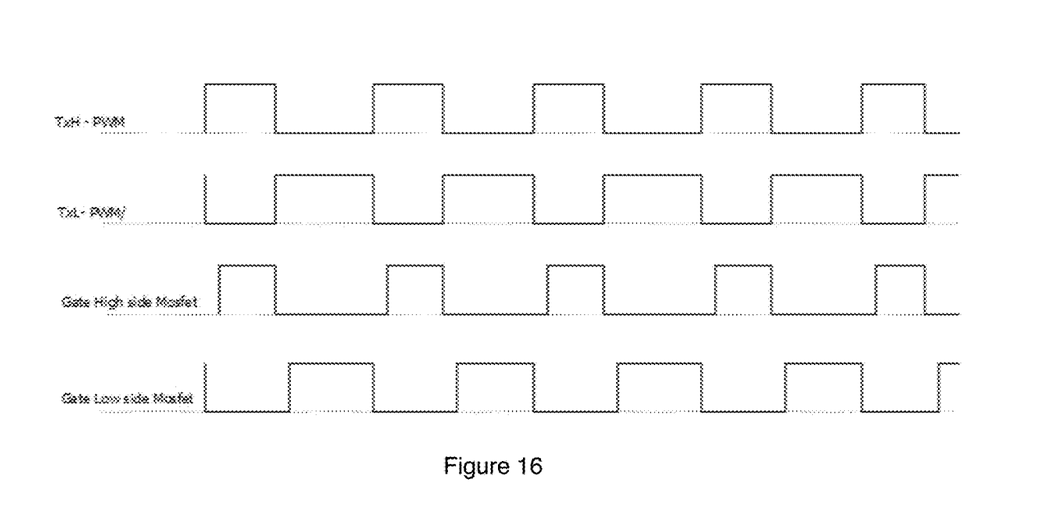
FIG. 16 shows the timing of the control signals of the transistors of the tri-phased bridge.
Figure 17:
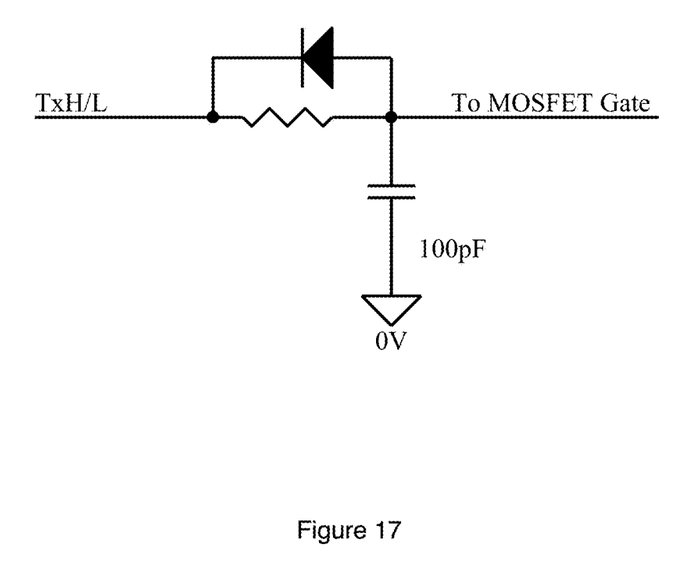
FIG. 17 shows an exemplary embodiment of a protection element described in FIG. 15.
Figure 18:
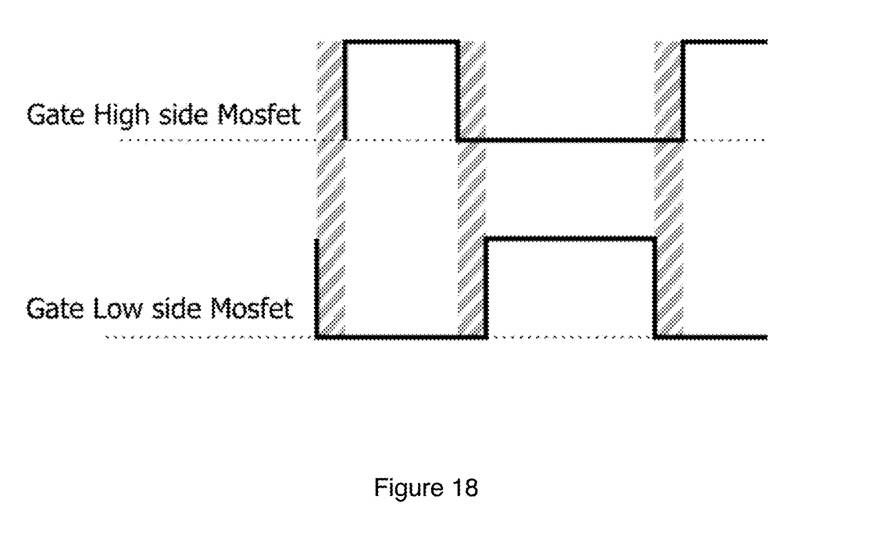
FIG. 18 shows a magnification of the signals of FIG. 16 showing the effect of the circuit of FIG. 17.

A driver circuit (14) of the power bridge transistor gates (13), in addition to the function of interfacing the voltage levels, incorporates the so-called dead-time feature protecting the transistors against simultaneous conduction of the two transistors of the same branch of the tri-phased bridge. This protective circuit described in FIG. 15, may be summarized as a delay of the rising edge of the conditioned PWM signal with the switching states. An example of practical embodiment is shown in FIG. 17, the chronograms of the driver signals of the power bridge transistors (13) are sown in FIG. 16, and a magnification in FIG. 18 shows the dead-time periods between the switching moments of the high and low transistors of the same branch of the power bridge (13).

Figure 3:
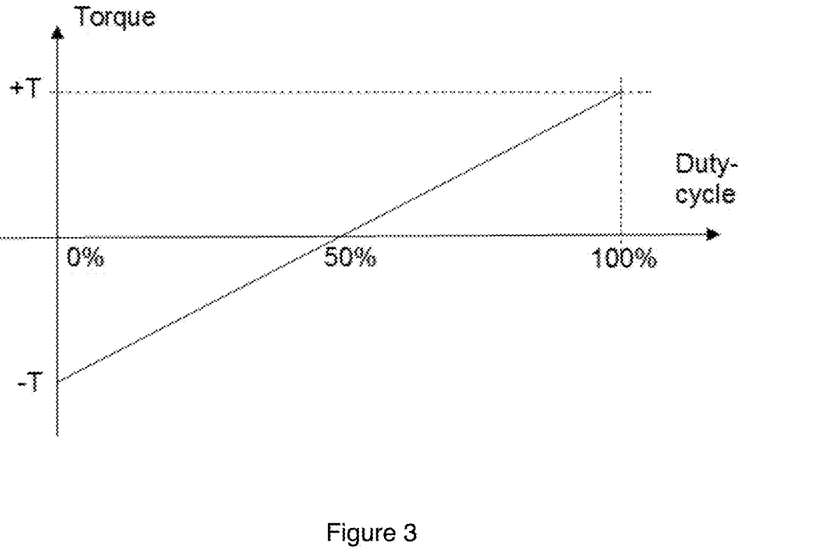
FIG. 3 shows an image of the torque applied to the motor as a function of the cyclic ratio in the case of the first embodiment.
Figure 4:
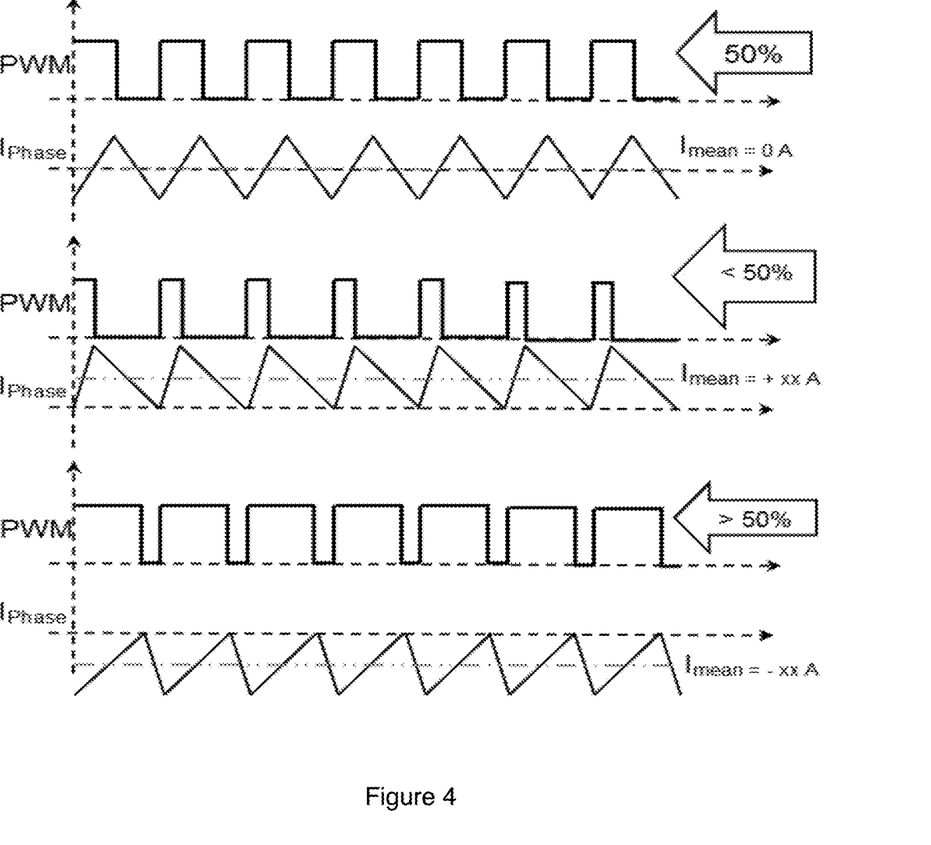
FIG. 4 shows the link between the cyclic ratio and the current applied to the phases of the motor in the case of the first embodiment.

FIGS. 3 and 4 illustrate the use that is made of the PWM signal and explains the general operating principle. In a proportional manner, the cyclic ratio makes it possible to determine the level of torque applied to the phases and therefore, as a function of the sign of the mean value of the resultant current, the rotation direction which will be given to the motor. At 50% cyclic ratio, the mean current is null in the phases, maintaining the motor in an idle state. At more than 50% cyclic ratio, the mean current obtained is positive, allowing the rotation in a direction of the motor and according to a torque level proportional to the current mean value. At less than 50% cyclic ratio, the mean current obtained is negative, allowing the rotation in another direction of the motor and according to a torque level proportional to the current mean value.

Figure 19:
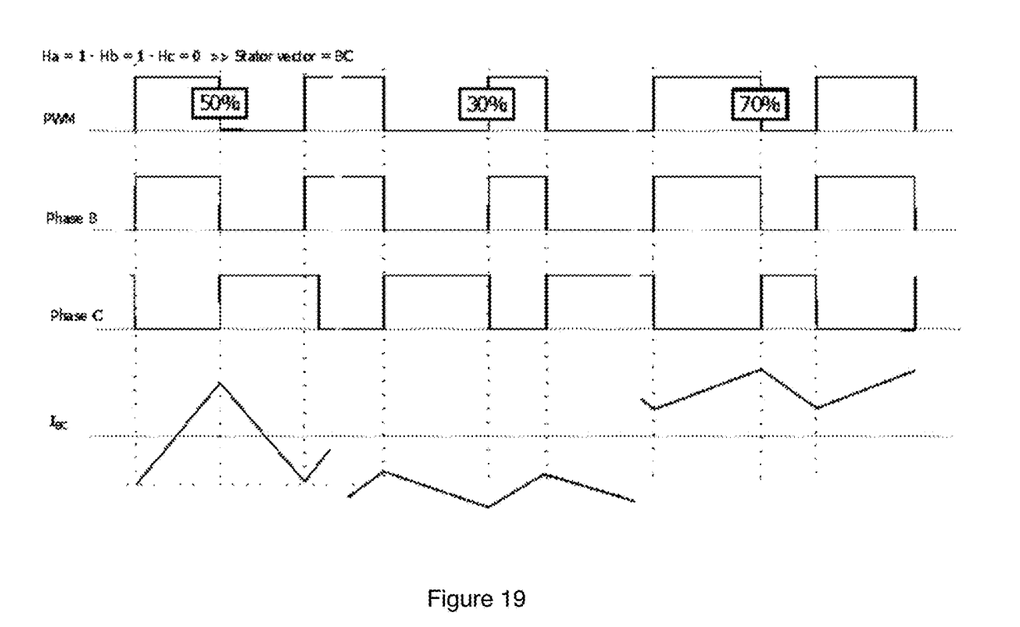
FIG. 19 shows the evolution of the motor current for a specific step and function of the cyclic ratio of the PWM signal.

FIG. 19 shows the previous explanations, detailing the particular case of a motor step in which the state of the probes Ha, Hb, Hc is respectively 1, 1.0 and for which the switching logic (14+15) applies the PWM signal to the control of the "high" transistor and the PWM signal complemented to the control of the "low" transistor of the power bridge (13). For a 50% cyclic ratio, the identical time for VBc=+Vbat and VBc=Vbat leads to a null mean value of the phase current. For a 30% cyclic ratio, the time for VBC=+Vbat is lower than the time for VBC=Vbat which leads to a negative mean value of the phase current. For a 70% cyclic ratio, the time for VBc=+Vbat is more than the time for VBC=Vbat which leads to a positive mean value of the phase current.

The driver principle of a brushless motor known by skilled professionals, is to apply an average voltage vector in advance of 90° electric on the rotor vector. For example, for a rotor vector given by the state of the Hall A=1, Hall B=1, Hall C=0 probes, the BC stator voltage vector will be applied for a rotation in a given direction. The application of the CB vector will be applied for an inverse rotation. From the demonstration in paragraph [0031], it is obvious that the cyclic ratio of the PWM signal will define the rotation direction of the motor.

The PWM signal is applied to the power bridge transistors (13) and thus defines through its cyclic ratio the average voltage applied to the terminals of the brushless motor (8). In addition to controlling the direction of the motor rotation, the PWM signal controls the torque of the motor as described in FIG. 3.

Figure 6:
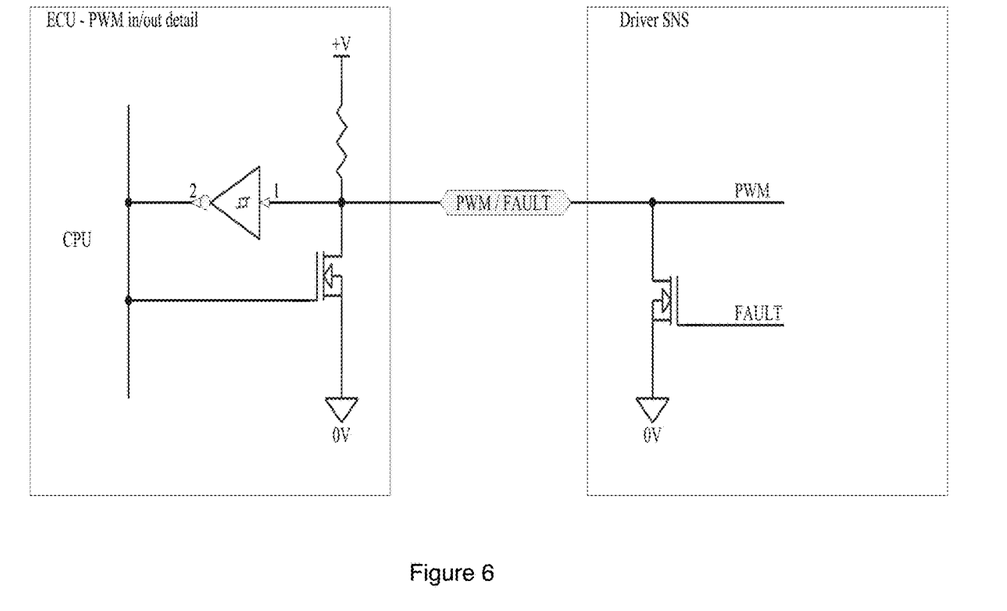
FIGS. 6 and 7 show the electronic block diagrams allowing the use of feedback on error.
Figure 7:
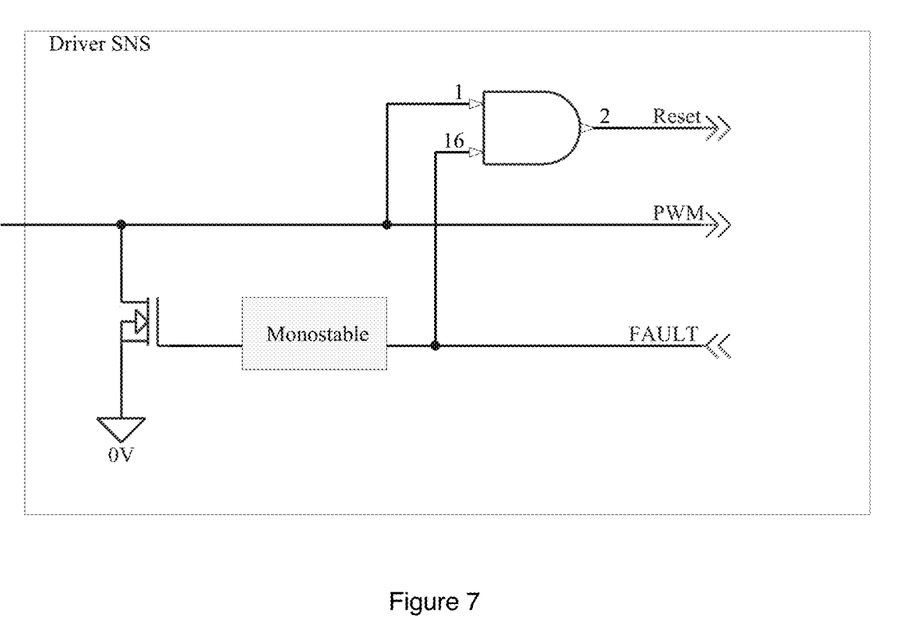

Insofar as the driver circuit provides a fault signal, it is possible to assemble this information to the ECU through a bidirectional link driving both the control PWM signal and the fault signal. The FIG. 6 diagram illustrates this.

Where the self-switching circuit of the driver circuit would require an acknowledgment of the fault signal, it may be envisaged to complete the diagram with the circuit given for example in FIG. 7, although other solutions on this same principle can be envisaged.

Figure 8:
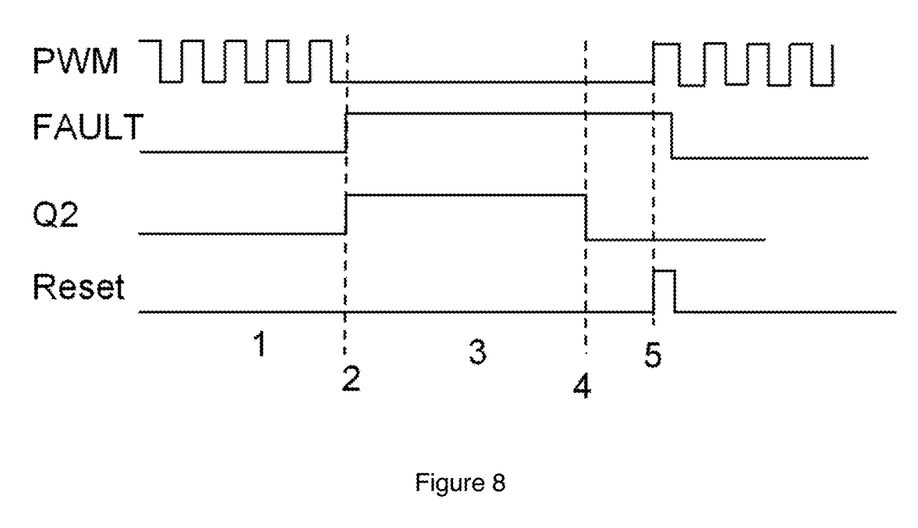
FIG. 8 is an explanatory diagram of the relevant signals associated with the use of the blocks described in FIGS. 6 and 7.

FIG. 8 explains therefore how this mode operates to enable error feedback:

In phase 1, no fault is noted, operation is normal, the driver circuit receive the PWM signal from the ECU.

In instance 2, the driver circuit sends error information triggering the monostable flip-flop which closes transistor Q2. The PWM signal is thus forced to zero.

During phase 3, the PWM signal is maintained at zero by the ECU which detected the fault.

At instance 4, the monostable flip-flop finds its original state and opens transistor Q2. Meanwhile the ECU may eventually extend phase 3 by forcing its PWM output to zero.

At instance 5, the ECU releases the forcing and returns its PWM signal. The ET gate goes to the logic level up the error acknowledgment input of the self-switching circuit and thus allows the return of the fault signal to zero. Normal operation resumes.

Figure 9A:
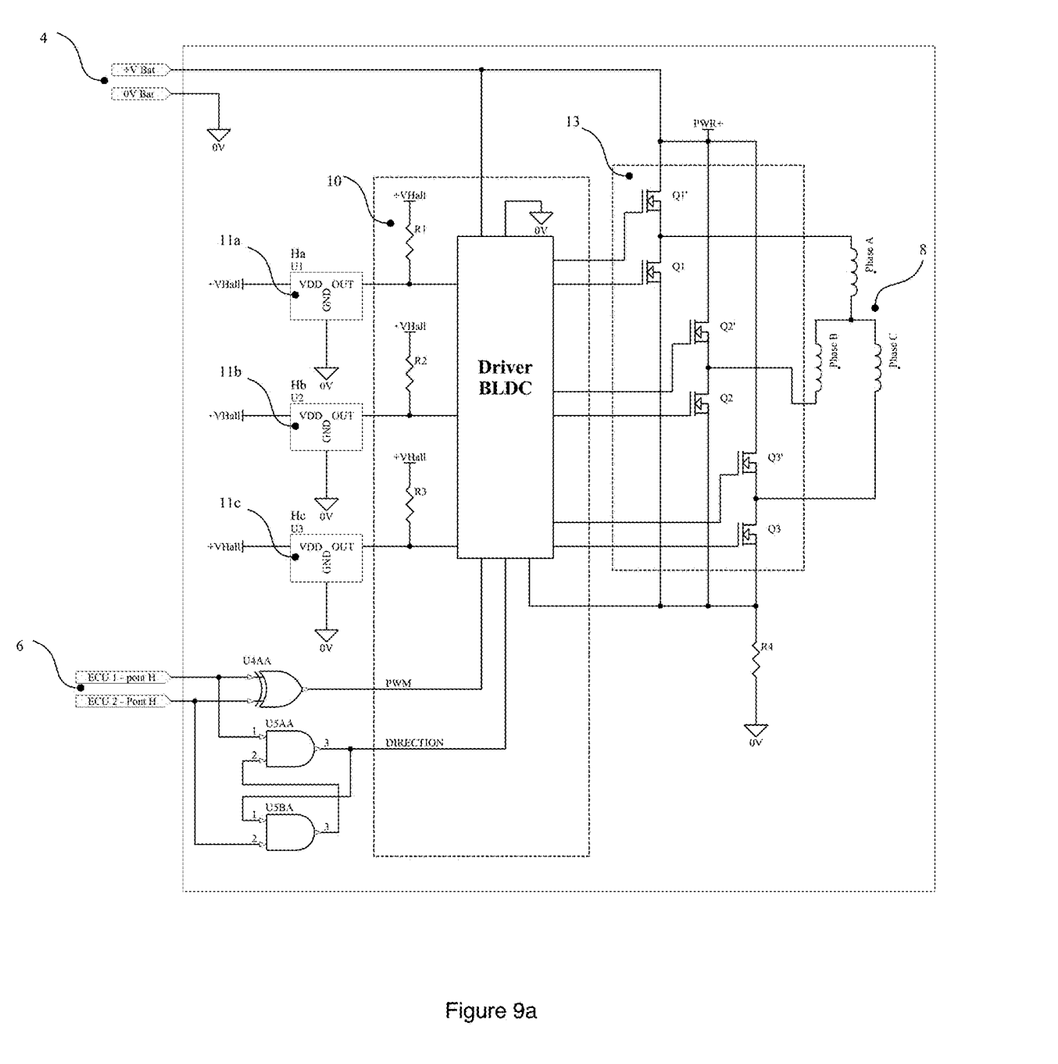
FIG. 9a shows a second embodiment of the invention in which the torque and steering control signals coming from an H power bridge of the ECU and processed by a set of logic gates.

As shown in FIG. 9*a*, a second embodiment mode of the invention may be envisaged where the steering and torque information are given by a two-wire signal from a H power bridge. Based on the potential of each wire, steering and torque level may be given. These signals require shaping for the driver circuit and it is therefore provided, upstream of the driver circuit, to use logic gates to format these signals.

The ECU provides steering information and torque control on 2 wires. This information comes from an H bridge initially dedicated to the control and supply of a DC motor. In this instance, the ECU program will remain identical to it allowing control of a DC motor.

The system requires 4 connection points: 2 for the power supply from the battery, 2 for the torque/direction control and also the 3 connection points dedicated to the absolute position sensor (7) also present on a DC system.

FIG. 9*a* remains simplified for the descriptive needs of the principle. The reference 0V is connected directly to the battery and the power currents circulating through this cable, the 0V of the ECU may be somewhat different. It will therefore be necessary to ensure that the detection levels on the signals coming from the ECU are sufficiently tolerant to these variable offsets on the reference potential.

A solution consists of interfacing the 2 wires from the H bridge with a differential circuit.

We shall not go back to the use of 1 or 2 RS flip-flops used for the discrimination of the rotation direction resulting from the signal provided by the H bridge of the ECU. This is specifically described in the FR2999825 application.

The PWM signal allowing the hashing of the power transistors will be entrusted to an EXCLUSIVE OR function extracting the information of the signal provided by the H bridge of the ECU.

Figure 9B:
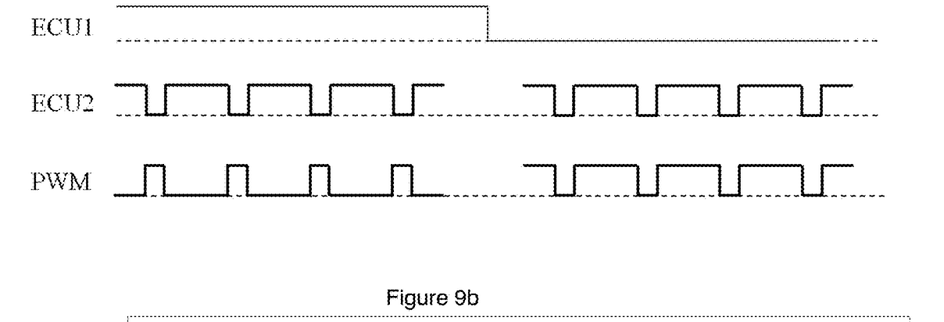
Figure 10:
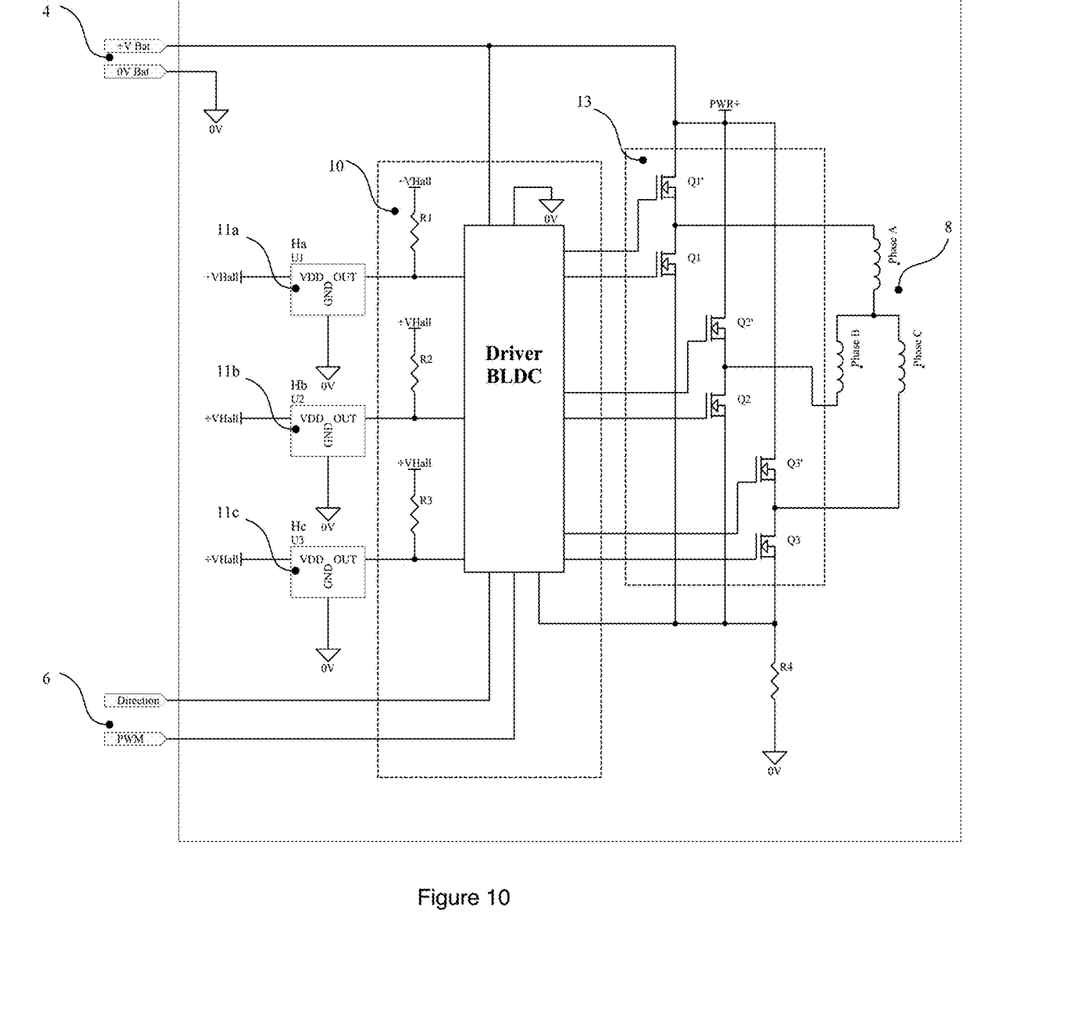
FIG. 10 shows a third embodiment of the invention in which the torque and steering control signals are in the form of two distinct PWM and all-or-nothing signals and directly entering the driver circuit.

As visible in FIG. 9b, it can be observed that the EXCLUSIVE OR makes it possible to obtain a logic signal at 1 when the outputs of the H bridge are different: the case in which the load is supplied. This EXLCUSIVE OR may be either a logic gate or thus a discreet solution built around transistors and diodes.

Where the ECU gives directly the two steering and torque information is given in FIG. 10. The use here is direct since the ECU provided directly the PWM and expected direction signals by the BLDC driver. No need for discrimination or specific treatment other than protection, filtering and traditional level adaptation in automotive interfaces.

A purist solution would be to add a fifth wire so as to have a common 0V reference between the ECU and the driver electronics. Nonetheless by considering the aforementioned comments, this wire may be optional.

Figure 11:
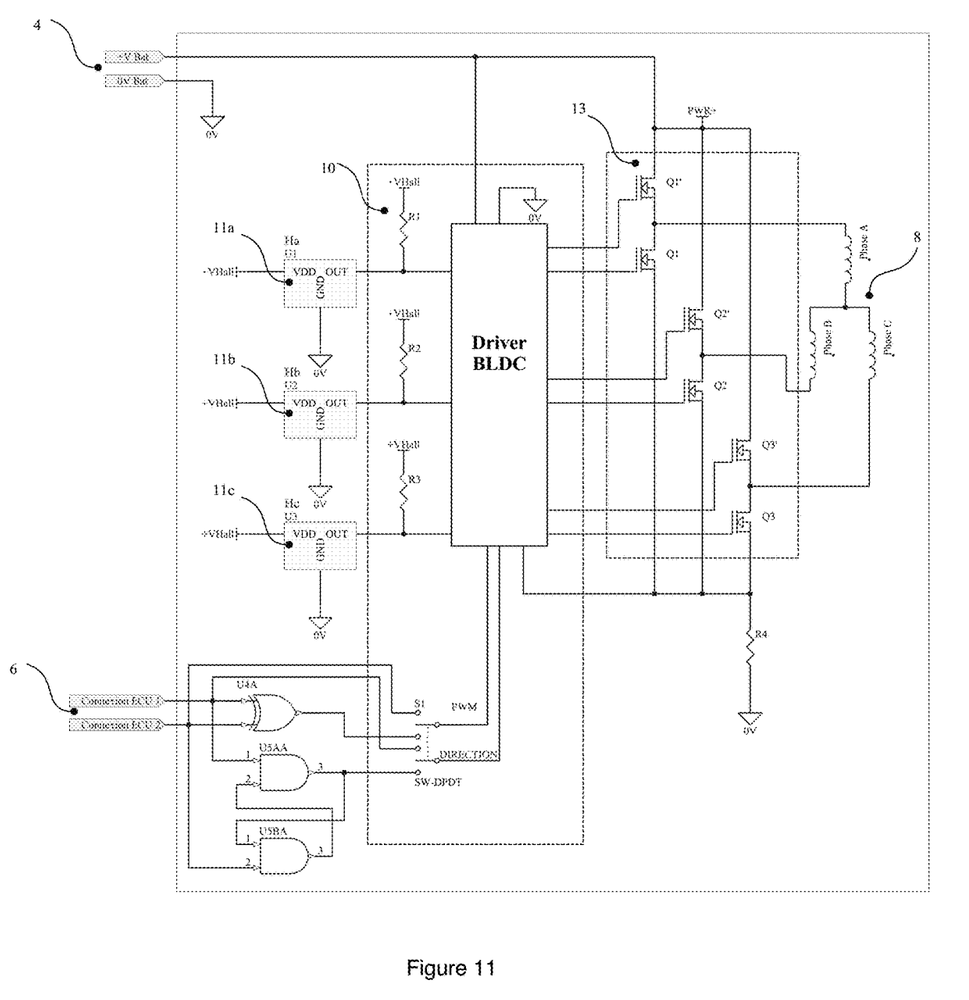
FIG. 11 shows a fourth embodiment enabling the mechatronic unit to be coupled to torque and steering signals coming from the ECU both in the form of a signal coming from a power bridge and PWM and al-or-nothing signals.

In the case where it is desired to have a single mechatronic unit capable of adapting to the types of signals supplied by the ECU, it may be envisaged to use a switch or other selection means enabling, in one position, the direct connection of the signals when the signals of the ECU are signals already formatted (PWM and "all-or-nothing" binary output) or else in the other position to transmit the signals coming from a power bridge through the logic gates described in FIGS. 9a and 9b in order to format the signals and to give a PWM signal for the torque and binary "all or nothing" information for the direction information. This adaptive embodiment mode is thus presented in FIG. 11.

Figure 20:
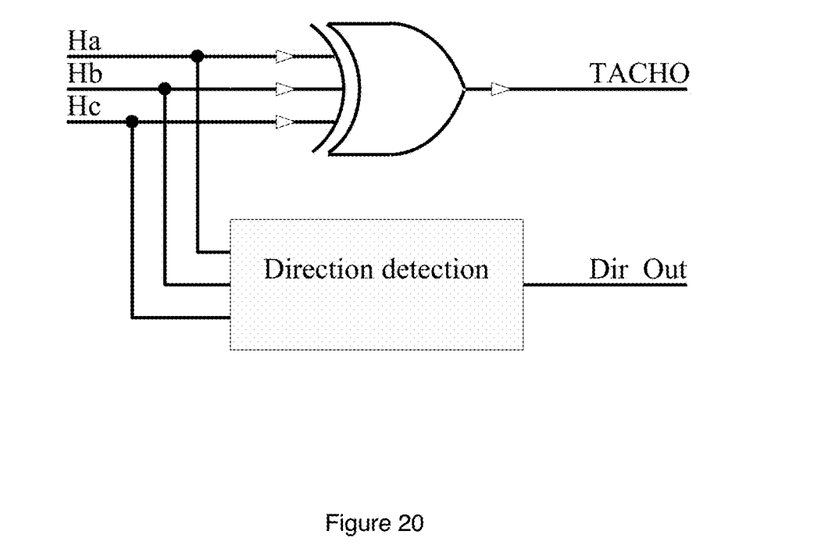
FIG. 20 shows the generation of speed and steering signals using three Hall probes of the motor.
Figure 21:
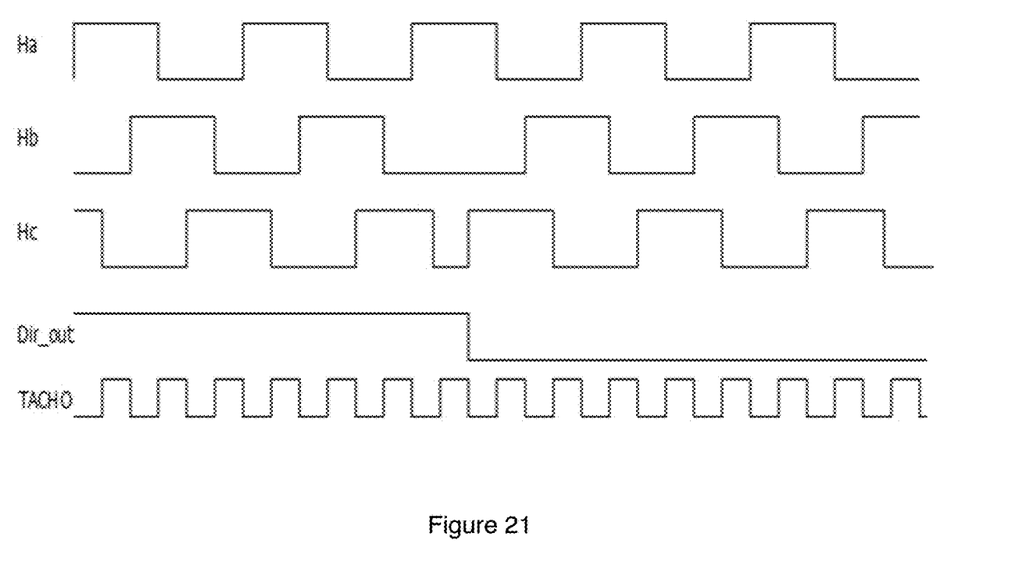
FIG. 21 shows the timing of the speed and steering signals.

In the case of an application with a control of the engine speed (8) by the ECU (1), it is possible to integrate into the electronic driver circuit (10) a way of measuring the speed and/or a way of detecting the rotation direction of the motor (8). Such methods may be done as indicated in FIG. 20. The detail of the generated signals ("TACHO"+"Dir_Out") is specified in FIG. 21. The "TACHO" signal and/or the "Dir_Out" signal is connected to the ECU (1) that calculates the speed of the motor by measuring the frequency of the "TACHO" signal. The "Dir_Out" signal indicates optionally the rotation direction of the motor (8) which can be different from the instruction direction requested by the torque and direction signal (6).

The sensing method of the rotation direction of the motor (8) may be done simply in a way identical to the direction discrimination done on a quadrature signal well known to those skilled in the art.

The invention claimed is:

1. A mechatronic unit for driving a member intended to be connected on the one hand to a DC power source and on the other hand to an ECU control unit that includes a computer operably calculating a servo algorithm delivering direction and torque information, the mechatronic unit comprising:
an actuator formed by an N-phase (where N>1) multi-phase brushless electric motor;
binary probes operably detecting a position of a rotor of the motor;
an electronic circuit comprising a power bridge operably supplying the N phases of the motor; and
an on-board electronic driver circuit free of a microcontroller, computer and memory, the input of which receives direction and torque information from the ECU and whose output controls the power bridge providing for self-switching of the motor by combining information from the direction and torque information, the direction and torque information of the ECU being a pulse width modulation (PWM) signal, the binary probes operably detecting the position of the rotor and a switching logic modulating directly a current of the DC power source applied to each of these motor phases,
wherein a polarity of current injected in to the motor defines a rotation direction and is dependent on a cyclic ratio of the PWM signal,
wherein the direction and torque information provided by the ECU is distinct from a power signal delivered only by the DC power source, and
wherein the on-board electronic driver circuit receives the direction and torque information from the ECU via a two-wire signal.

2. The mechatronic unit according to claim 1, wherein the output of the on-board electronic driver circuit is indissociated and directly applied to the control of transistors of the power bridge.

3. The mechatronic unit according to claim 1, wherein motor torque is a dependent function on the cyclic ratio (D) of the PWM signal based on the formula: Torque=f (D-0.5).

4. The mechatronic unit according to claim 1, wherein a first direction signal and a second torque signal is included in the direction and torque information delivered by the ECU.

5. The mechatronic unit according to claim 1, wherein the direction and torque information is delivered by the ECU as a first direction information from a first direction signal and a second torque information from a second torque signal, where this information is applied to a set of logic gates.

6. The mechatronic unit according to claim 1, further comprising extracting a first direction signal and a second torque signal from the direction and torque information delivered by the ECU as a first direction information from a power H bridge where this information is applied to a set of logic gates.

7. The mechatronic unit according to claim 1, further comprising a bidirectional link configured to signal a defect of the mechatronic unit to the ECU in the form of information forcing the PWM signal to zero.

8. The mechatronic unit according to claim 1, wherein speed and/or direction information are fed back to the ECU.

9. The mechatronic unit according to claim 1, wherein the ECU uses the speed ("TACHO") and/or direction ("Dir_Out") information to regulate motor speed.

10. The mechatronic unit according to claim 1, wherein the ECU uses speed ("TACHO") and/or direction ("Dir_Out") information to control motor speed.

11. The mechatronic unit according to claim 1, wherein the ECU uses speed ("TACHO") and/or direction ("Dir_Out") information to diagnose the mechatronic unit.

12. The mechatronic unit according to claim 4, wherein the direction and torque information is delivered by the ECU as the PWM signal.

13. The mechatronic unit according to claim 4, wherein the extraction of the first direction signal and the second torque signal delivers a first direction state when the pulse width over a period is less than a threshold value (50%), and a second direction state when the pulse width over a period is greater than or equal to this threshold value.

14. The mechatronic unit according to claim 4, wherein the extraction of the first direction signal and the second torque signal delivers a torque signal as a function of the deviation in absolute value between a reference value and the cyclic ratio of the direction and torque information delivered by the ECU.

15. The mechatronic unit according to claim 7, wherein the bidirectional link is configured to acknowledge the fault after being taken into account by the ECU by sending back information in normal operation to the mechatronic unit.

16. The mechatronic unit according to claim 13, wherein the threshold value is equal to a reference value.

17. The mechatronic unit according to claim 14, wherein a threshold value and the reference value are 0.5.

18. A mechatronic unit comprising:
   a first connection on the one hand to a battery DC power source of an automobile and a second connection on the other hand to an ECU control unit,
   a computer for calculating a servo algorithm delivering direction and torque information,
   an actuator formed by a N-phase (where N>1) multi-phased brushless electric motor,
   binary sensors for detecting a position of a motor rotor,
   an electronic circuit comprising a power bridge for supplying the N phases of the motor, and
   another on-board electronic driver circuit whose input receives the direction and torque information from the ECU, the direction and torque information of the ECU being a pulse width modulation (PWM) signal, and whose output controls the power bridge directly modulating current of the battery DC power source applied to each of these motor phases,
   wherein a polarity of current injected into the motor defines a rotation direction and is dependent on a cyclic ratio of the PWM signal,
   wherein the direction and torque information provided by the ECU is distinct from an output power signal delivered only by the battery DC power source, and
   wherein the on-board electronic driver circuit receives the direction and torque information from the ECU via a two-wire signal.

19. The mechatronic unit according to claim 1, wherein the electronic driver circuit measures speed of the motor.

20. The mechatronic unit according to claim 1, wherein the electronic driver circuit measures an actual rotation direction of the motor.

21. The mechatronic unit according to claim 18, wherein the motor regulates a camshaft phase relative to a motor shaft.

22. The mechatronic unit according to claim 18, wherein the motor regulates a flue gas recirculation valve.

23. The mechatronic unit according to claim 18, wherein the motor regulates a variable geometry turbo.

* * * * *